United States Patent [19]

Zioni et al.

[11] 4,060,730
[45] Nov. 29, 1977

[54] SCINTILLATION CAMERA FOR ESTABLISHING THE COORDINATES OF A RADIATION STIMULI PRODUCED BY A RADIATION FIELD

[75] Inventors: Jacob Zioni; Yitzhak Klein; Dan Inbar, all of Haifa, Israel

[73] Assignee: Elscint, Ltd., Haifa, Israel

[21] Appl. No.: 503,767

[22] Filed: Sept. 6, 1974

Related U.S. Application Data

[63] Continuation-in-part of Ser. No. 395,149, Sept. 7, 1973, abandoned.

[51] Int. Cl.² .......................... G01T 1/20; G01T 1/164
[52] U.S. Cl. ................................ 250/369; 250/363 S; 250/366
[58] Field of Search ............. 250/363, 366, 369, 363 S

[56] References Cited

U.S. PATENT DOCUMENTS

| 3,732,419 | 5/1973 | Kulberg et al. | 250/369 X |
| 3,851,177 | 11/1974 | Van Dijk et al. | 250/369 X |
| 3,862,425 | 1/1975 | Myers | 250/369 X |
| 3,911,278 | 10/1975 | Stout | 250/363 S |
| 3,953,735 | 4/1976 | Stout | 250/363 S |

Primary Examiner—Archie R. Borchelt
Attorney, Agent, or Firm—Donald M. Sandler

[57] ABSTRACT

A scintillation camera has a planar scintillating crystal that produces light events whose spatial distribution corresponds to the spatial distribution of the radiation stimuli causing such events, and a plurality of photomultipliers having photocathodes for receiving light from the crystal through a planar face thereof. Computing circuitry coupled to the photomultipliers computes the projection of a light event in the crystal on a reference axis by forming an analytical function of the outputs of the photomultipliers according to the spatial location of the light event in the crystal.

33 Claims, 20 Drawing Figures

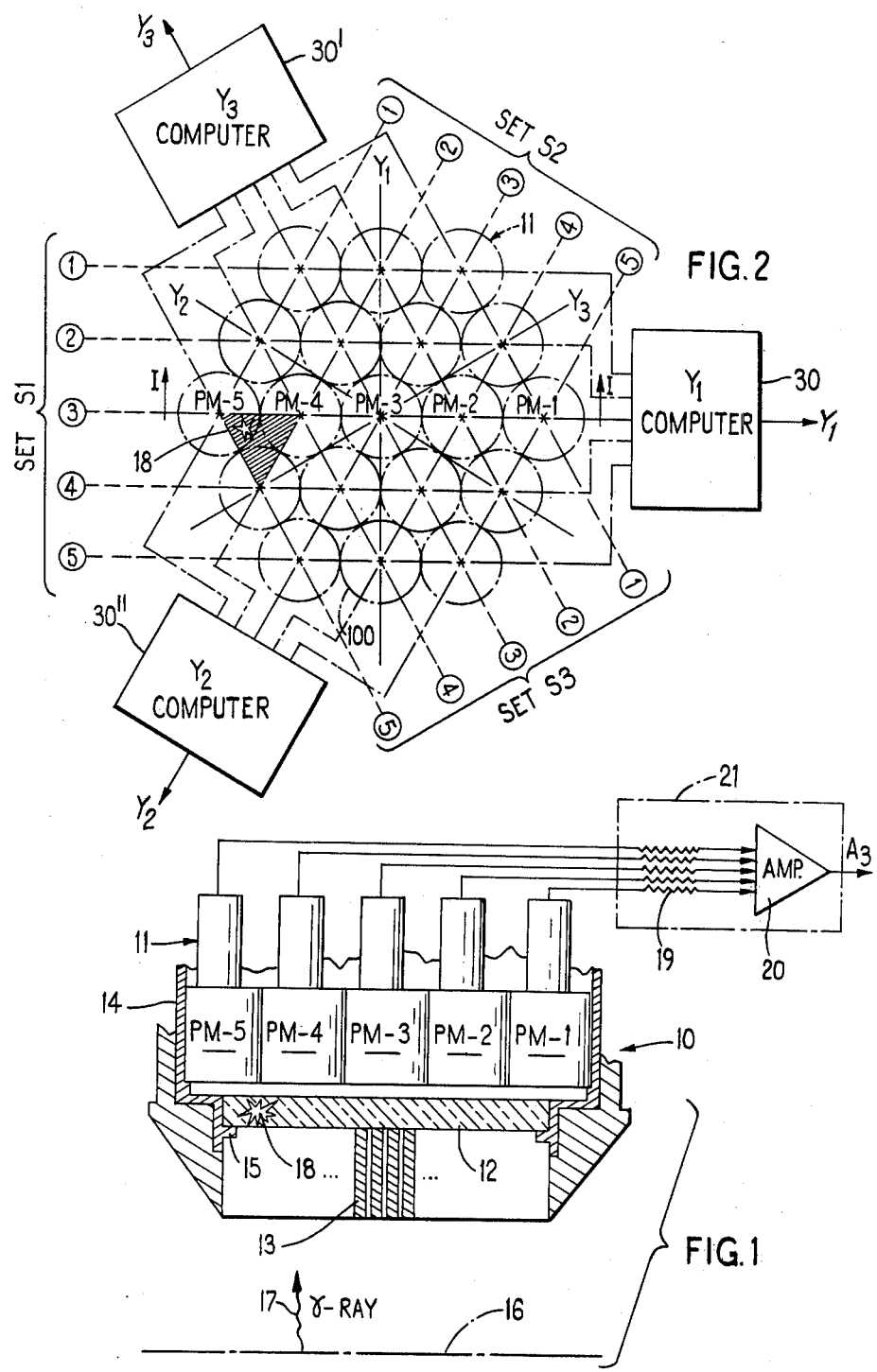

| EVENT OCCURS BETWEEN THESE ROWS | WHEN | FOR ROW INTERPOLATION | | | | |
|---|---|---|---|---|---|---|
| | | 1 ROW USED | 2 ROWS USED | 3 ROWS USED | 4 ROWS USED | 5 ROWS USED |
| 1 & 2 | $A_1 > A_3$ | $A_1$ or $A_2$ | $A_2 + A_3$ $A_1 - A_2$ | $A_2 + A_3 + A_4$ $A_1 - (A_2 + A_3)$ | $A_2 + A_3 + A_4 + A_5$ $A_1 - (A_2 + A_3 + A_4)$ | $A_1 - (A_2 + A_3 + A_4 + A_5)$ |
| 2 & 3 | $A_1 < A_3$ AND $A_2 > A_4$ | $A_2$ or $A_3$ | $A_1 + A_2$ $A_3 + A_4$ $A_2 - A_3$ | $A_3 + A_4 + A_5$ $A_2 - (A_3 + A_4)$ $A_3 - (A_1 + A_2)$ | $A_2 - (A_3 + A_4 + A_5)$ $(A_1 + A_2) - (A_3 + A_4)$ | $(A_1 + A_2) - (A_3 + A_4 + A_5)$ |
| 3 & 4 | $A_5 < A_3$ AND $A_4 > A_2$ | $A_3$, $A_4$ | $A_2 + A_3$ $A_4 + A_5$ $A_3 - A_4$ | $A_1 + A_2 + A_3$ $A_3 - (A_4 + A_5)$ $A_4 - (A_2 + A_3)$ | $A_4 - (A_1 + A_2 + A_3)$ $(A_4 + A_5) - (A_2 + A_3)$ | $(A_4 + A_5) - (A_1 + A_2 + A_3)$ |
| 4 & 5 | $A_5 > A_3$ | $A_4$, $A_5$ | $A_3 + A_4$ $A_4 - A_5$ | $A_2 + A_3 + A_4$ $A_5 - (A_3 + A_4)$ | $A_1 + A_2 + A_3 + A_4$ $A_5 - (A_2 + A_3 + A_4)$ | $A_5 - (A_1 + A_2 + A_3 + A_4)$ |

FIG. 8

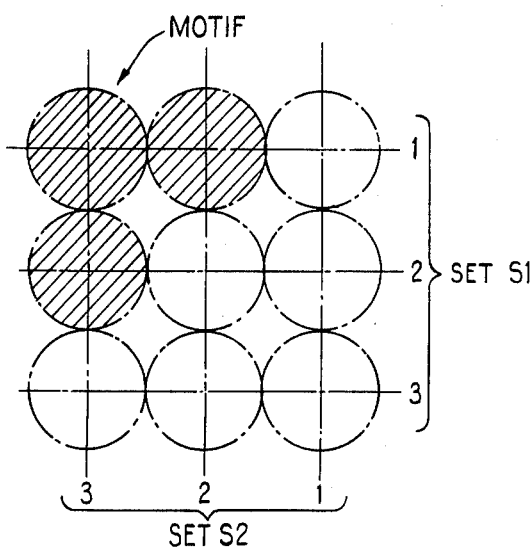

FIG. 9

SCINTILLATION CAMERA FOR ESTABLISHING THE COORDINATES OF A RADIATION STIMULI PRODUCED BY A RADIATION FIELD

This application is a continuation-in-part of copending application Ser. No. 395,149 filed Sept. 7, 1973, now abandoned.

This invention relates to scintillation cameras for establishing the planar coordinates of radiation stimuli produced by a radiation field.

Such scintillation cameras, termed cameras of the type described, conventionally comprise a scintillator crystal for receiving external radiation stimuli, an array of photomultipliers associated with the crystal and positioned with their optical axes perpendicular to the plane of the crystal so that their photocathodes receive light from the crystal, and electronic circuitry for utilizing the outputs of the photomultipliers. Depending upon such factors as the energy of a radiation stimulus and the crystal thickness, an interaction between the stimulus and the lattice structure of the crystal will probably occur generating a pinpoint of light (light event) at the site of the interaction. From such site, light is propagated omnidirectionally, and a portion is received on the photocathodes of the various photomultipliers, each of which produces an output functionally related to the quantity of light incident on its photocathode. From the photomultiplier outputs, the electronic circuitry computes the coordinates of the light event.

Scintillation cameras of the type described are used to map the distribution density of radiation fields and are of great value in medicine where the fields are created in patients by the injection or introduction of radioactive pharmaceuticals. The resultant maps yield significant medical information of value in the study, testing and treatment of a patient.

U.S. Pat. No. 3,011,057 issued to H. O. Anger, discloses a typical scintillation camera of the type described, wherein the photomultipliers are arranged in a hexagonal pattern over a circular crystal, and have overlapping fields of view. A hexagonal pattern is selected because it achieves the densest clustering possible of photomultipliers having circular photocathodes.

Computation of the displacement of a light event from each of two orthogonal coordinate axes is achieved by weighting the outputs of each of the photomultipliers in accordance with its distance from the coordinate axis in question, and summing the outputs of the photomultipliers. The weighted sum of the photomultiplier outputs used to calculate the displacement of a light event from a coordinate axis represents a fixed analytical function of the outputs. Because a single analytical function is used for computation purposes irrespective of the location in the crystal of a light event, the two parameters that are measures of the quality of performance of a scintillation camera of the type described, namely resolution and uniformity, are spatially dependent (i.e., are dependent on the location of the light event in the crystal). In other words, the resolution and uniformity for a given analytical function of photomultiplier outputs may be much better for events that occur in one region of the crystal as compared to events that occur in other regions.

Another conventional camera of the type described is disclosed in U.S. Pat. No. 3,717,763 issued to Tanake et al. In this camera, the coordinate position of a photomultiplier establishes a delay time by which the photomultiplier signals can be separated in time sequence. The maximum resolution and linearity of this camera depend on the similarity between the shape of the resultant electronic pulse and the shape of the waveform produced as a result of the geometric configuration of the device. Thus, this detector uses the time domain as the basis for calculating position and, as a consequence, has a relatively long dead time.

It is therefore an object of the present invention to provide a new and improved scintillation camera having improved resolution and uniformity and reduced dead time.

Briefly, the present invention provides for computing the coordinates of a light event by providing for the analytical function of the output of the photomultiplier to be dependent on the location of the light event in the crystal. The spatial dependence of the analytical function permits, for example, one analytical function to be used when an event occurs in one region of the crystal, and another analytical function to be used when an event occurs in another region, each analytical function being selected so as to optimize both resolution and uniformity for events occurring in the region where the function is used for computation purposes. In this manner, substantially the same resolution and uniformity can be maintained over the entire crystal.

In conventional scintillation cameras, it is the practice to arrange the photomultipliers in a pattern whose motif includes at least three photomultipliers and which is defined by at least two sets of intersecting parallel rows of photomultipliers, each set of parallel rows being associated with and perpendicular to a reference axis of the coordinate system lying in the plane of the crystal. In general, the present invention provides for the computation of the projection of an event on a reference axis by using row signals, each of which is the sum of the outputs of a row of photomultipliers in a set with which the reference axis is associated. In one embodiment of the invention, the computation of the projection of a light event on one of the reference axes is achieved by using a row signal produced by one of the two adjacent rows, termed the "base rows", of photomultipliers in the set between which the light event has occurred. This eliminates signal information from photomultiplier tubes that are distant from the light event, which signal information tends to degrate the intrinsic resolution of a scintillation camera. Thus, using the present invention, computation of the projection of a light event on a reference axis uses a signal from a row near the event regardless of where the event has occurred to the exclusion of signals from rows remote from the event. In modifications of this embodiment, various combinations of row signals from the rows adjacent to the event can be utilized.

In the first embodiment of the invention, a logical analysis of the relative magnitude of the row signals of a set of photomultipliers associated with a reference axis identifies the base rows of the set, i.e., those two rows of the set of parallel rows associated with the reference axis between which the light event has occurred. For example, the base rows are the first two rows of a set of five rows for a hexagonal array of 19 photomultipliers when the magnitude of the row signal produced by the first row exceeds the magnitude of the row signal produced by the third row.

Once specified, the base rows of each set intersect and define the motif of the array of photomultipliers within which the light event has occurred and thus the appropriate spatial location of the event becomes known. The precise location of the event in the motif may be obtained by interpolating between the base rows of two or more of the sets. Such interpolation is simplified because the amplitude of a row signal produced by either of the base rows will change substantially linearly between fixed limits as the light event moves between the base rows in a direction perpendicular thereto (i.e., parallel to the reference axis with which the rows are associated.)

While the above described embodiment provides adequate results in many applications, certain inadequacies exist which are objectionable in other applications. Such inadequacies relate to the results achieved when a light event occurs in a region of the crystal adjacent a line connecting the centers of a row of photomultipliers. The problem is created by the nonlinearity of the amplitude of a base signal when a light event occurs in this region.

In a second embodiment of the present invention, the solution to the problem is achieved by generating a pair of signals that are different analytical functions of the outputs of the photomultipliers in a set with which the reference axis is associated, each of the signals varying linearly as the projection of a light event moves along the reference axis over different portions thereof, and each of which varies nonlinearly as the projection of the light event moves along the reference axis over a common portion thereof. When the projection of the event on the axis is in a portion over which either one or the other of the pair of signals is linear, the computation of the projection is based on the linear signal, while when the projection of the event is in the common portion of the reference axis over which the signals are nonlinear, the computation is based on an analytical combination of the two signals.

Two embodiments of the invention are illustrated by way of example in the accompanying drawings wherein:

FIG. 1 is a sectional view taken along the line I—I of FIG. 2 showing a gamma camera head;

FIG. 2 is a plan view of a gamma camera head utilizing 19 photomultipliers arranged in a pattern whose motif is an equilateral triangle showing the resultant three sets of intersecting parallel rows of photomultipliers and the three reference axes with which the sets are respectively associated;

FIG. 8 is a chart summarizing some of the possible analytical functions of the photomultiplier outputs for a hexagonal array of 19 photomultipliers;

FIG. 9 is a plan view of another pattern of photomultipliers arranged in a pattern whose motif is a rectangle;

Figure 11:
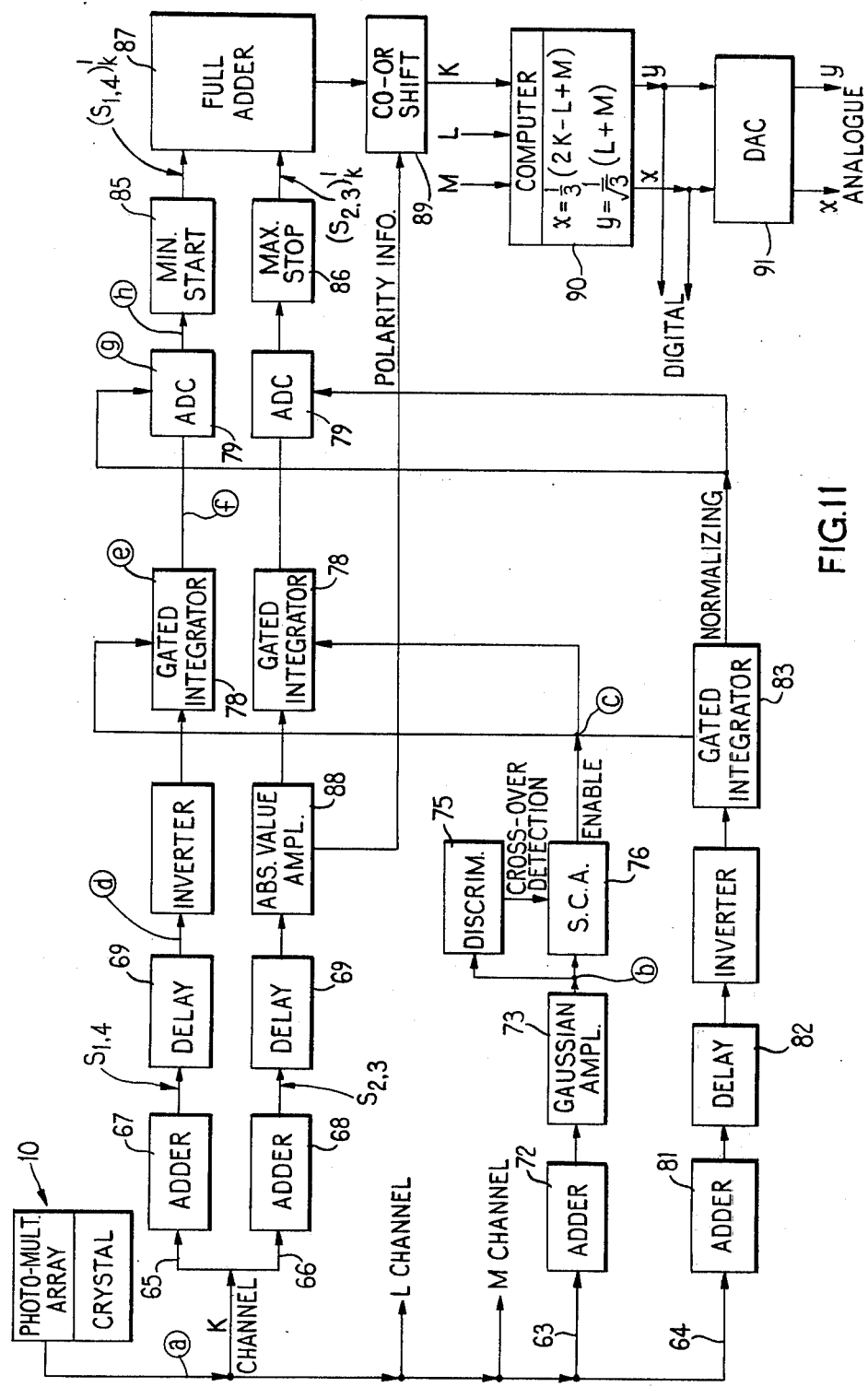
FIG. 11 is a block diagram of a second embodiment of the invention.

FIGS. 12(a) to (h) are waveforms at the locations in FIG. 11 specified by the letters (a) to (h).

Referring now to FIG. 1 of the drawings, reference numeral 10 designates a head for a scintillation camera comprising a plurality of photomultipliers each of which is designated by reference numeral 11, a scintillator crystal 12, a collimator 13, and a housing structure 14 by which the components are held together in a unitary manner. Crystal 12 is a disc-shaped, planar scintillating crystal, such as a thallium-activated sodium iodide, mounted in the housing 14 by means of suitable shoulders 15. Such crystals are available in different sizes; and a convenient size in wide use at the present time is 12 inches in diameter.

Collimator 13 interposed between the crystal 12 and the radiation field 16 has a plurality of holes, the axes of which are perpendicular to the plane of the crystal, for the purpose of passing only those gamma rays which originate in the radiation field in a region directly beneath the hole. The photomultiplier tubes 11 are conventional in nature and, with a 12 inch scintillation crystal, it is conventional to utilize 19 photomultipliers each of whose diameter is about 3 inches. The photomultipliers are arranged in a five-row hexagonal pattern as shown in FIG. 2. The optical axes of these photomultipliers are perpendicular to the plane of the crystal as shown in FIG. 1, and the photocathodes of the photomultipliers are spaced from the upper surface of the crystal 12 in order to optimize the geometrical sensitivity of the photomultipliers. The spacing is chosen so that the geometric sensitivity is constant and has the largest value.

The gamma ray 17 emanating from a point in the radiation field 16 and passing through a hole in the collimator 13 above the point will enter the crystal 12, and, depending on its energy and the thickness of the crystal, will interact therewith at some depth causing light event 18 to occur. Such light event is seen by all of the photomultipliers. It is the function of the circuitry associated with the head 10 to compute the coordinates of the point in the radiation field causing such light event.

Before referring to this circuitry, it will be helpful to an understanding of the invention to define some general terms in connection with the array of photomultipliers shown in FIG. 2 since the invention is applicable to other arrays. In general, the motif of any repeating pattern of photomultipliers, regardless of their number, must include at least three photomultipliers. For a hexagonal arrangement, the motif is an equilateral triangle, while for a square arrangement the motif is a square. In either case, the motif is defined by at least two sets of intersecting parallel rows of photomultipliers. For the hexagonal arrangement shown in FIG. 2, there are three sets of parallel rows, the rows of each set being perpendicular to respective ones of the reference axes Y1, Y2, and Y3, which lie in the plane of the crystal. Furthermore, the three sets of rows intersect each other at 60° which is the same angle at which the reference axes intersect each other. For convenience, the set $S_1$ perpendicular to the $Y_1$ reference axis have been marked in FIG. 2 as rows 1-5, and the five photomultipliers of row 3 of set $S_1$ have been marked $PM_1$ to $PM_5$. Row 3 of set $S_1$ is typical of any row in the same or other set although the number of photomultipliers in a row varies from three to five in number.

Associated with each of the 15 rows of photomultipliers is an adder circuit by which the outputs of the photomultipliers in the row are summed to produce 15 row signals in response to a light event. Considering row 3 of set $S_1$ as a typical row, the outputs of each of the 5 photomultipliers $PM_1$ to $PM_5$ is connected by equal summing resistors 19 to a summing amplifier 20 which, together with the resistors, constitute an adder circuit 21. When a light event occurs in crystal 12, the photocathodes of each of the five photomultipliers receive light in proportion to the square of its distance from the light event. The row signal A3 thus produced by circuit 21 is an analogue of the total quantity of light received by the five photomultipliers in the row.

The other photomultipliers of the detector head also receive light so that the adders associated with the other four rows of set $S_1$ also produce row signals. In the first embodiment of the invention, the logical analysis set forth in the second column from the left in the chart of FIG. 8 is carried out on the various row signals A1–A5 of each set upon occurrence of a light event. From such analysis, the base rows of each set can be identified establishing the coarse coordinates of a light event as can be seen in FIG. 1 wherein a typical light event is indicated by reference numeral 18. For such an event, logical analysis of the resultant row signals will indicate that the event occurs between rows 3 and 4 of set 1, between rows 1 and 2 of set 2 and between rows 4 and 5 of set 3. The intersections of these base rows define the motif (shown by the shading lines) containing the light event.

The fine coordinates of an event are determined by an interpolation process involving the base rows of a set. In general, the interpolation involves an analytical function of the photomultiplier outputs that is spatially dependent since the interpolation requires the use of one or more row signals including a row signal selected from either one or the other of the base rows. If the event occurs between rows 1 and 2, for example, the analytical function of the outputs could be the row signal $A_2$ while for an event occurring between rows 4 and 5, the analytical function could be the row signal $A_4$. The base row providing the row signal used for interpolation is termed the selected base row while the other base row is termed the nonselected base row. When only one row signal is involved in the interpolation, its amplitude varies substantially linearly with the location of the event between the base rows. This can be seen from the graph in FIG. 3. Considering the row signal A1 when an event occurs between rows 1 and 2, it will have a maximum value should the event occur on row 1 (i.e., zero rows from the selected row) and a minimum value should the event occur on row 2 (i.e., one row from the selected row). Actually, the row signal Ai for the ith row of photomultipliers varies linearly for light events in the vicinity of the ith row, but becomes nonlinear for events in the vicinity of the $i+1$st and the $i-1$st row. In many cases, the inaccuracies arising because of the above-described nonlinearity are acceptable. In cases where greater accuracy is required, the approach taken in the second embodiment can be utilized.

Figure 4:
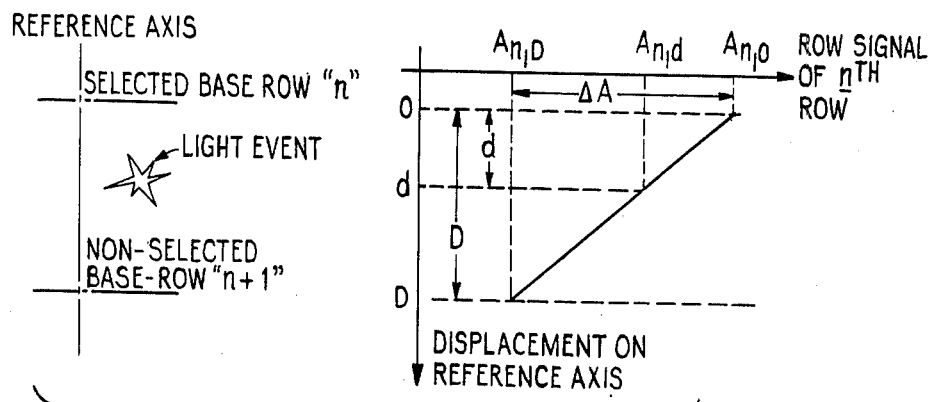
FIG. 4 is a plot showing the manner in which interpolation between rows is carried out.

The line-interpolation required for the fine coordinates is illustrated in detail in FIG. 4 for the nth and the $n+1$st row of a set. Assuming the nth row is the selected base row, it can be seen that the value of row signal $A_n$ produced by the nth row will have the value $A_{n,o}$ should an event occur on row n of the set. (Actually, the row signal strength is normalized to reduce amplitude dependence on the energy level of the radiation stimulus causing the event, and this is discussed in detail below.) If the distance between rows (i.e., the row spacing of the photomultipliers) is designated by D, the row signal for the nth row will have the value $A_{n,D}$ should an event occur on row $n+1$ of the set. Since the values $A_{n,o}$ and $A_{n,D}$ are fixed values known from calibrating the device, the quantity $\Delta A$ is known thus fixing the slope $\Delta A/D$ of the variation of the row signal with displacement $d$ of the event relative to the selected base row. The displacement $d$ of the event from the selected base row is thus $$d = (D/\Delta A)(A_{n,o} - A_{n,d}) \tag{1}$$

where $A_{n,d}$ is the value of the row signal produced by the selected base row when an event occurs a distance $d$ therefrom. The displacement $d'$ of the event from the nonselected base row is:

$$d' = (D/\Delta A)(A_{n,d} - A_{n,D}) \tag{1A}$$

The only variable in either of equations (1) and (1A) is $A_{n,d}$ which represents the value of the row signal produced by the selected base row in response to the occurrence of an event a distance $d$ from such row. Thus, the interpolation of the event between rows can be carried out making use of either equation (1) or (1A).

When only a single row is to be used for interpolation, either of the two base rows can be used. Thus, if the logical analysis of all of the row signals indicates that the event has occurred between rows 2 and 3, the row signal of either of these rows can be used to compute the distance of the event from the selected row.

Sometimes the accuracy of the interpolation can be increased by utilizing more available information, and the interpolation may be based on more than a single row signal. For example, interpolation may be based on the sum of row signals produced by the selected base row and another row signal produced by a non-base row in the set adjacent to the selected base row. In the event that the number of rows of a set is large enough, the interpolation can be achieved using the sum of the row signals produced by the selected base row and two other row signals produced by two non-base rows in the set closest to the selected base row, etc.

A general form of Equation (1) can be written as follows:

$$d = (D/\Delta B)(B_{n,o} - B_{n,d}) \tag{1B}$$

where $$B_j = \sum_{i=j}^{h} A_i \text{ and } h \geq j, j = 1, 2, \ldots.$$

Figure 3:
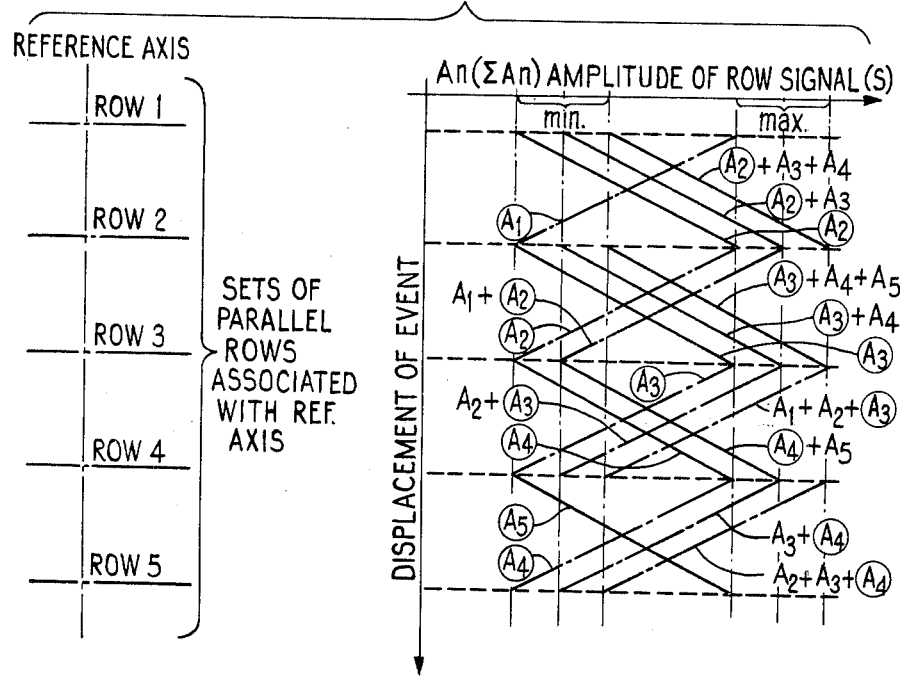
FIG. 3 shows one of the three sets of rows of photomultipliers of the detector head shown in FIG. 2 together with a plot of the variation of the amplitude of the selected base row signals produced by the photomultipliers as a function of the displacement of the light event between adjacent rows.

Constraints are placed, however, on the rows that can be used as indicated in the two columns on the right of the Chart shown in FIG. 8. Thus, when it is desired to use two rows and the event occurs between rows 1 and 2, interpolation is preferably based only on the sum of $A_2$ and $A_3$, which sum has the slope indicated in FIG. 3 for a variation in displacement of the event between the base rows 1 and 2. Note that an event between these rows will be displaced from the selected base row, namely row 2, by zero and one row for the maximum value of the sum and by one and two rows for the minimum value of the sum. In FIG. 3, the row signal produced by the selected base row is circled for convenience in identification.

Figure 6:
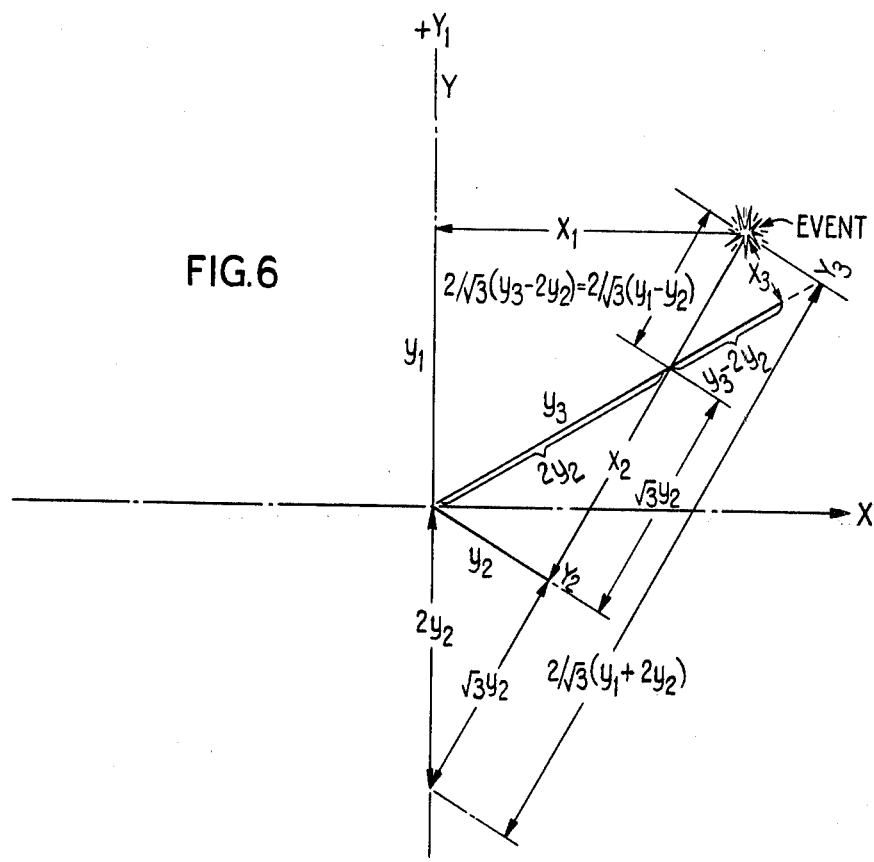
FIG. 6 is a plot showing the relationship between the reference axes shown in FIG. 2 and a set of Cartesian coordinate axes.

Once the base rows of each set are identified and the interpolation between the base rows is carried out for each set, the projection of the event on each of the reference axes is determined. For the configuration shown in FIG. 1, there are three reference axes designated Y1, Y2 and Y3 with the projections, measured from the intersection of the reference axes, of the event thereon being designated y1, y2, and y3, respectively. Such projections can be combined to yield the Cartesian coordinates. Assuming the origin is at the centre of the array (i.e., at the intersection of the reference axes) and that the $x + y$ coordinate axis coincides with the $+Y1$ axis, FIG. 6 shows the geometric relationship between the known projections y1, y2 and y3 and the projections x1, x2, and x3 normal to the y projections. The x projections are tabulated below:

$$x_1 = (y_1 + 2y_2)/\sqrt{3} = (y_3 + y_2)/\sqrt{3} \quad (2)$$

$$x_2 = (2y_1 + y_2)/\sqrt{3} = (2y_3 - y_2)/\sqrt{3} \quad (3)$$

$$x_3 = (y_1 - y_2)/\sqrt{3} = (y_3 - 2y_2)/\sqrt{3} \quad (4)$$

From inspection of FIG. 6, it can be seen that $y_1 = y_3 - y_2$ so that the coordinates of the event are:

$$y = y_1 \quad (5)$$

$$x = x_1 = (y_3 + y_2)/\sqrt{3} \quad (6)$$

It is preferred to utilize the projections $y_2$ and $y_3$ to compute the x-coordinate in order to make such computation independent of possible errors in computation of the projection $y_1$ and thus increase the accuracy of the coordinates. Furthermore, the projections $y_1$, $y_2$ and $y_3$ could be based on separate origins and/or the Cartesian coordinate origin can be at a location other than the geometric center of the crystal.

Figure 5:
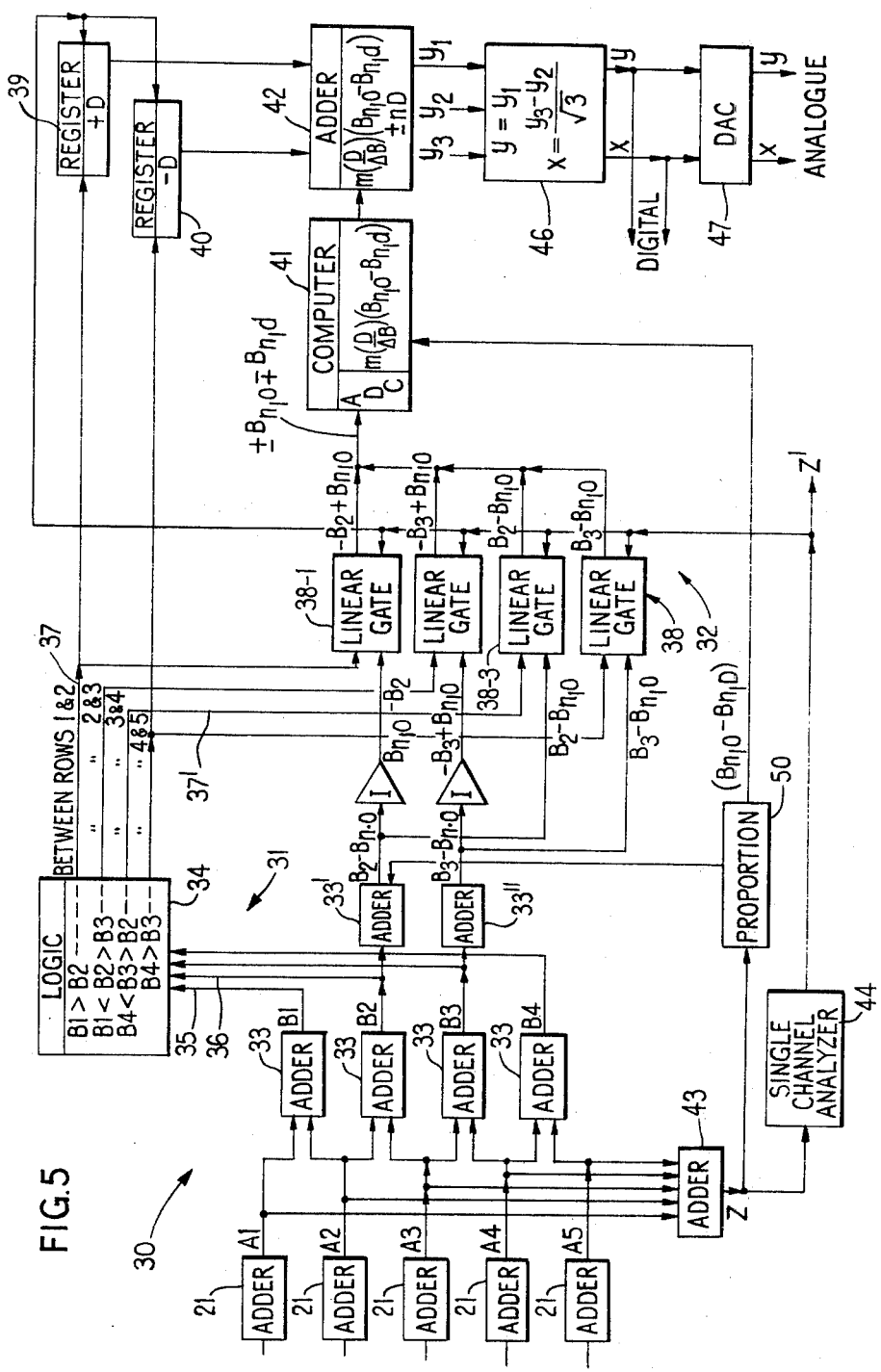
FIG. 5 is a block diagram of one embodiment of the present invention.

When the row signals from two rows are utilized for interpolation, based on Curtesian coordinates whose origin is located at the geometric center of the crystal, the computation of the coordinates using equation (1A) can be carried out using the apparatus shown in FIG. 5 to which reference is now made. The block diagram of FIG. 5 shows details associated with the computation of the projection on the Y1 reference axis, it being understood that similar computations are carried out for the other two reference axes. The means 30 for computing the displacement of a light event on reference axis Y1 thus comprises five adder circuits 21 individually associated with the five rows of set S1 for producing the row signals A1–A5, the base row detector circuit 31 for specifying the base rows associated with an event, and a line interpolation circuit 32 for computing the projection of the event on the reference axis.

The base row detector circuit 31 comprises the four adders 33 for computing the four row signal sums: B1 = A1 + A2, B2 = A2 + A3, B3 = A3 + A4 and B4 = A4 + A5; and logic circuit 34 to which the signal sums are applied. If the level at input line 35 of circuit 34 exceeds the level at line 36 (i.e., B1 > B2, or A1 > A3), then output line 37 changes from a low logical level to a high logical level. All of the other output lines will remain at low levels. Thus, a high level in line 37 specifies that the base rows associated with the event are rows 1 and 2. Similarly, a high level at the other output lines specifies the base rows associated with an event.

Line interpolation circuit 32 includes the array of gates 37, storage resistors 39 and 40, digital computer module 41, and adder 42. The output of circuit 43, which is proportional to the total energy of the radiation stimulus causing the light event, is applied to single channel analyzer 44 whose output is a transfer pulse Z' when the total energy of the radiation stimulus lies within a preselected band of energies as determined by the setting of the analyzer.

Each of the four gates 38 is provided with three inputs. One input is derived from the respective output lines of logic circuit 34, one from one of the adders 33' and 33", and one from the output of analyzer 44. Adder 33' performs the subtraction $B2 - B_{n,o}$ where the quantity $B_{n,o}$ is furnished from a proportionality circuit 50 according to the relationship $B_{n,o} = \alpha Z$ where $0 < \alpha \leq 1$. Similarly, adder 33" performs the subtraction $B3 - B_{n,o}$.

Only one of the four gates 38 will affect a transfer of information to module 41 when a light event of the requisite intensity occurs. Thus, if a light event were to occur as indicated at 18 in FIG. 2, then A5 < A3 > A2 so that B4 < B3 > B2 with the result that line 37' would change to a high level enabling gate 38-3 at whose other input would appear the signal $B2-B_{n,o}$ (where B2=A2+A3 and $B_{n,o}$ is proportional to Z). Thus enabled, gate 38-3 would pass the signal $B2-B_{n,o}$ to module 41 upon the application to this gate of the pulse Z' desired from analyzer 44.

Figure 7:
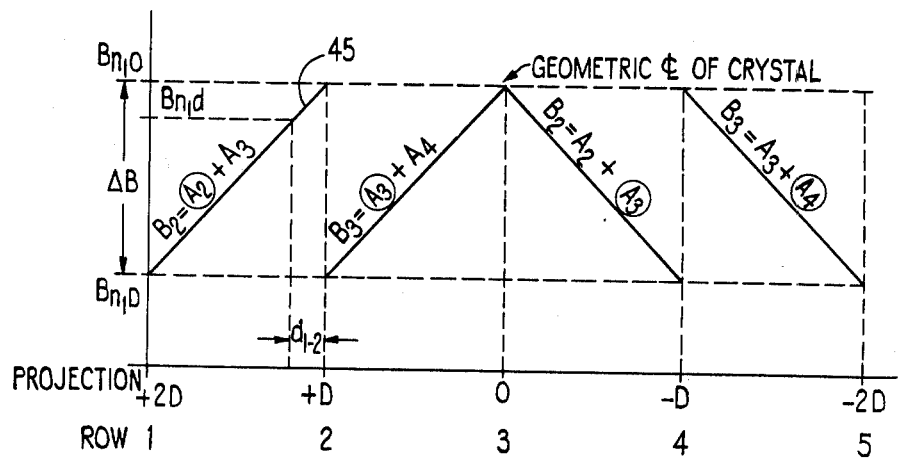
FIG. 7 is a plot like that shown in FIG. 3 but specific to the embodiment of FIG. 5.

The manner in which interpolation circuit 32 computes the displacement of the light event on the reference axis Y1 can be understood by referring to FIG. 7 which represents the variation in the amplitude of the sums of two rows signals with displacement of the light event between rows as listed in Chart I. Note that between base rows, each curve varies between fixed limits. Thus, curve 45, representing the variation of B2 between the base rows 1 and 2, has a maximum value of $B_{2,0}$ (since the selected base row is the second) and a minimum value of $B_{2,D}$. In general, for the nth sum $B_n$, the variation is between the limits $B_{n,o}$ and $B_{n,D}$, the slope being $\Delta B/D$ where $\Delta B = B_{n,o} - B_{n,D}$ and D = the distance between rows.

In general, the distance of an event from a base row is as follows:

$$d_{i,j} = (D/\Delta B)(B_{n,o} - B_{n,d}) \quad (7)$$

where $d_{i,j}$ represents the distance of the event from the selected one of the base rows $i$ and $j$, and $B_{n,d}$ represents either the sum of the rows signals produced by rows 2 and 3 or the sum of the rows signals produced by rows 3 and 4 depending on the location of the event. For example, if the event occurs between rows 3 and 4, $B_{n,d}$ represents the sum of the row signals produced by rows 2 and 3, and $d_{i,j}$ represents the distance of the event from the selected base row 3.

The general form of the displacement $y_1$ of an event from the geometric center of the crystal as measured along the $Y_1$ reference axis is:

$$y_1 = (m)(D/\Delta B)(B_{n,o} - B_{n,d})_1 + nD \quad (8)$$

where $m = \pm 1$, $n = o, \pm 1$ depending on the base rows, and the subscript "1" refers to the sums of row signals produced by the rows of Set $S_1$. Note that the quantities $B_{n,o}$ and $B_{n,d}$ are normalized by division with $\Delta B$ which is proportional to the total light produced by the event. Expressions similar to equation (8) define $y_2$ and $y_3$. From equation (8) and inspection of FIG. 7, the displacement $y_1$ as a function of the base rows is:

$$y_1 = D + (D/\Delta B)(B_{2,o} - B_{2,d}), \text{ event between rows 1 and 2} \quad (8A)$$

$$y_1 = (D/\Delta B)(B_{3,o} - B_{3,d}), \text{ event between rows 2 and 3} \quad (8B)$$

$$y_1 = -(D/\Delta B)(B_{3,o} - B_{2,d}), \text{ event between rows 3 and 4} \quad (8C)$$

$$y_1 = -D - (D/\Delta B)(B_{4,o} - B_{3,d}), \text{ event between rows 4 and 5} \quad (8D)$$

With the above as background, it can be seen that computer 41 accepts the analogue signal passed by one of the gates 38 (i.e., $\pm B_{n,d}$ depending upon the location of the event), converts the signal to digital form for processing, and performs the multiplication and division indicated: $m(D/\Delta B)(B_{n,o} - B_{n,d})$. The quantity $\Delta B$ has a value that is dependent on the total light produced by the event and is developed by proportional circuit 50.

Instead of digital computation, computer 41 may be an analogue computer or a combined digital/analogue computer. For example, the division $(D/\Delta B)$ could be carried out using a Wilkinson-type A.D.C. wherein the rate of change of the discharge current performs the division according to the total energy of an event. In any event, the output of computer 41 is applied to adder 42 to which is also applied the contents of either of registers 39 or 40, depending on the location of the event. The output of the computer is applied to adder 42 to which is also applied the contents of either of registers 39 or 40 depending on the location of the event.

If the event occurs between lines 1 and 2, the signal applied to computer 41 by gate 38—1 is $-B_{2,d} + B_{n,o}$. Since line 37 is the only line having a high level, the contents of register 39 is passed to adder 42 by reason of the transfer pulse Z'. The output of adder 42 is thus the quantity set out in equation (8A).

In like manner, the displacements $y_2$ and $y_3$ of the event on the other two reference axes are computed. Each of the three displacements $y_1$, $y_2$ and $y_3$ is applied to computer module 46 which performs the operations indicated to produce the Cartesian coordinates $x$ and $y$ in digital form. Digital-to-analogue converter (DAC) 44 may be provided if the coordinates are described in analogue form. Furthermore, the analogue output of DAC 47 may be applied to an oscilloscope to position its beam at the coordinates of the light event and in such case the transfer pulse Z' would be applied to the intensity control of the scope thus rendering the event visible on the scope at a spatial location corresponding to the point in the radiation field emitting a gamma ray.

While the computation of the displacement $y_1$, $y_2$ and $y_3$ are indicated as being carried out in digital form, such computation can also be carried out in analogue form. Furthermore, the approach shown in FIG. 7 is typical regardless of the number of rows used for interpolation purposes in the computation, and regardless of whether sums or differences of the row signals are used. Note that when differences of row signals or sums of row signals are considered, the order (i.e., sign) of the row signals can be varied to provide either a positive or negative slope for the interpolation curve. In addition, the method of computation may vary depending on the location of the base rows. For example, the electronics can be considerably simplified if the origin is located at the edge of the crystal, and a single base row is used for interpolation if the event occurs between the row passing through the origin and the next row, while two rows are used if the event occurs between the two rows adjacent to the row passing through the origin, etc.

From inspection of equations (8A-D), it can be seen that the projection of an event on a reference axis is computed from an analytical function of the outputs of the photomultipliers that depends on the location of the event in the crystal. For an event between rows 1 and 2, equation (8A) shows that the analytical function is $-B_{2,d}$, the inverse of the sum of row signals A2 and A3, while for an event between rows 3 and 4, the analytical function is $+B_{2,d}$, the sum of row signals $A_2$ and $A_3$. Thus, the computation of the projection is carried out using information that will most accurately locate the event and provide for a uniform resolution regardless of where the event has occurred in the crystal.

While unweighted sums of the outputs of the photomultipliers are used to form the analytical functions described above, other functions of the outputs may be suitable. Trial and error experimentation may reveal analytical functions of the output that will provide improved results.

The uniformity of the scintillation camera can be improved by using the computing circuitry shown in the second embodiment of the invention. Uniformity is the ability of the camera to respond to uniformly distributed light events (i.e., light events that are produced by a uniform rain of gamma rays over the entire crystal) by computing the coordinates of the resultant events and producing a uniform display. From actual results using the first embodiment of the invention, it has been found that the uniformity along the centerlines of the rows of photomultipliers is not as good as required in some instances. The problem appears to arise because of the nonlinearities in the selected base row signals as a function of displacement of events from the base rows, and because of ambiguities that arise when events occur within a narrow region straddling a line connecting the centers of a row of photomultipliers.

In the second embodiment of the invention described below, not only is the uniformity improved, but the processing time per event is reduced since the spatial location of the event necessary to establish the optimum analytical function of the outputs of the photomultipliers is determined simultaneously with the function. These improved results are achieved by forming suitable analytical functions of outputs. While two functions are disclosed below, it is obvious that other functions could be used and indeed more than two could be used.

For a hexagonal array of 19 photomultipliers defining three reference axes and having five rows of photomultipliers in each of the three sets of rows associated with the respective reference axes, the preferred analytical functions in each set are:

$$S_{1,4} = A_1 + A_5 - K_0 A_3 \quad (9A)$$

$$S_{2,3} = A_1 + A_2 - (A_4 + A_5) \quad (9B)$$

where $A_i$ is the value of $i$th row signal and $K_0$ is a linearization constant explained below.

Figure 10:
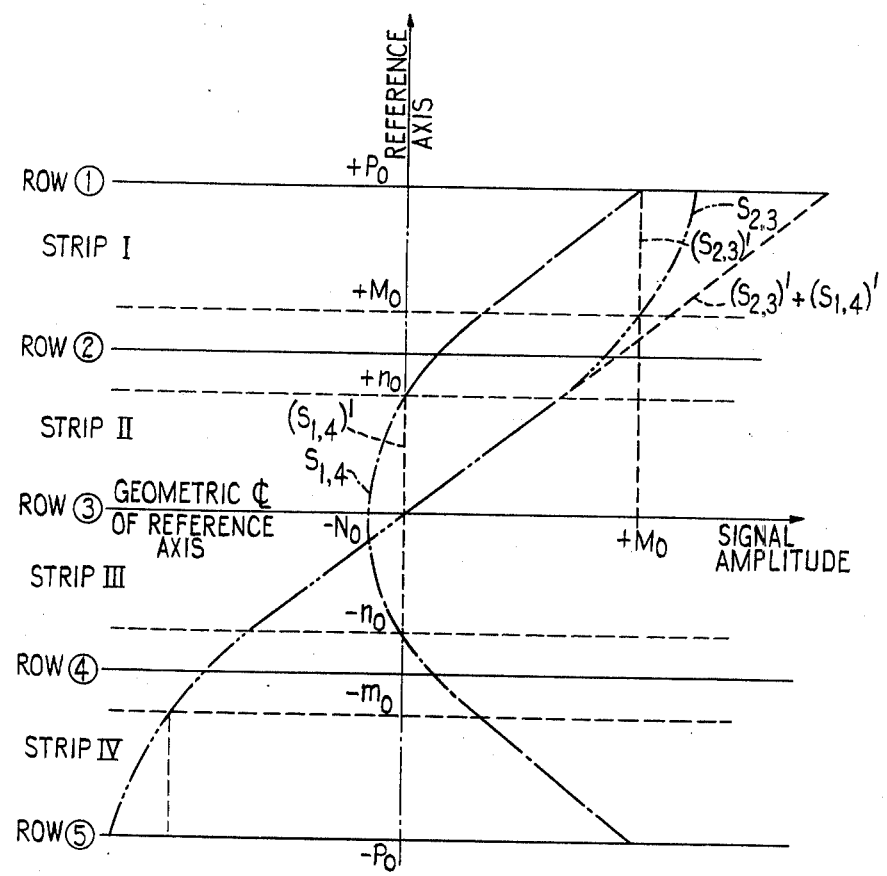
FIG. 10 is a plot showing the variation of certain sum signals with displacement of the light event.

The function of equation (9A) is symmetrical about the geometrical centerline of the set of rows (i.e., row 3), while the function of equation (9B) is a mirror function that changes polarity or crosses over at row 3, all as shown in FIG. 10. Considering the sum signal $S_{1,4}$ of a set of rows, it is linear for events whose projections fall on the reference axis associated with the set in a region adjacent the edges of the crystal (i.e., the intervals $+m_o$ to $+P_o$ and $-m_o$ to $-P_o$ as shown in FIG. 10). Sum signal $S_{1,4}$ begins to become nonlinear for events whose projections fall on the reference axis in a region adjacent the geometrical centerline (i.e., in the interval $\pm n_o$), and indeed has zero magnitude for events whose projections occur at displacements $\pm n_o$ from row 3, reaching a minimum negative value for an event whose projection falls on row 3.

With regard to the sum signal $S_{2,3}$, it is linear for events whose projections fall on the reference axis in a region containing the geometrical center of the crystal (i.e., in the interval $\pm n_o$ as shown in FIG. 10). Beyond this region, (i.e., in the intervals $+m_o$ to $+P_o$ and $-m_o$ to $-P_o$), this sum signal is nonlinear. From experimental results, the transition points at which sum signal $S_{2,3}$ becomes nonlinear can be ascertained, the projection of such points on the reference axis being designated $\pm n_o$. When these points are known, the constant $K_o$ can be determined to force a zero value for the sum signal $S_{1,4}$ at the points $\pm n_o$.

As shown in FIG. 10, the two sum signals vary linearly over different portions of the reference axis (e.g., $S_{2,3}$ is linear in the interval O to $+n_o$ and $S_{1,4}$ is linear in the interval $+m_o$ to $+P_o$) and nonlinearly over a predetermined common portion of the axis (e.g., both signals are nonlinear in the interval $+n_o$ to $+m_o$). Note that the curvature of the two sum signals over the common portion is opposite. By modifying these sum signals, a direct computation of the projection of an event on a reference axis can be carried out involving an addition of the two modified sum signals.

The sum signal $S_{1,4}$ is modified by considering only positive values of the signal. Thus, for events whose projection lie in the intermal $\pm n_o$, the modified sum signal $(S_{1,4})'$ has zero value, while for events beyond this interval, the modified sum signal has the value of the unmodified sum signal $S_{1,4}$. Mathematically, this can be expressed:

$$(S_{1,4})' = \begin{array}{l} 0 \text{ when } S_{1,4} \leq 0 \\ S_{1,4} \text{ when } S_{1,4} > 0 \end{array} \quad (10A)$$

The sum signal $S_{2,3}$ is modified by considering no values in excess of the value $|M_o|$ where $|M_o|$ is the absolute value of $S_{2,3}$, while the events beyond this interval, the absolute value of the amplitude for events whose projection on the axis lies at the points $\pm m_o$. Thus, for events whose projection lie in the interval $\pm m_o$, the modified sum signal $(S_{2,3})'$ has the value of the modified sum signal is $|M_o|$. Mathematically, this can be expressed:

$$(S_{2,3})' = \begin{cases} |S_{2,3}| \text{ when } |S_{2,3}| < M_o \\ |M_o| \text{ when } |S_{2,3}| \geq M_o \end{cases} \quad (10B)$$

The projection of an event on the reference axis is thus obtained from $(S_{2,3})' + (S_{1,4})'$. Note that the analytical function of the outputs of the photomultipliers is dependent on the spatial location of an event as follows:

| Event In This Strip | Projection In This Interval | Analytical Function |
|---|---|---|
| Strip I | $+m_o$ to $+p_o$ | $M_o + A_1 + A_5 - K_oA_3$ |
| Strips I & II | $+n_o$ to $+m_o$ | $A_1 + A_5 - K_oA_3 + A_1 + A_2 - (A_4 + A_5)$ |
| Strip II | 0 to $+n_o$ | $A_1 + A_2 - (A_4 + A_5)$ |
| Strip III | 0 to $+n_o$ | $A_1 + A_2 - (A_4 + A_5)$ |
| Strips IV & V | $-n_o$ to $-m_o$ | $A_1 + A_5 - K_oA_3 + A_1 + A_2 - (A_4 + A_5)$ |
| Strip V | $-m_o$ to $-p_o$ | $-M_o + A_1 + A_5 - K_oA_3$ |

Circuitry for computing the coordinates of a light event using the techniques illustrated in FIG. 10 is shown in detail in FIG. 11 where the camera head is designated by reference numeral 10. The outputs of the photomultipliers are applied in parallel to three channels, K, L and M each of which is associated with one of the three reference axes, to an energy window channel 63, and to a normalizing channel 64. Each of the K, L and M are identical so that only one, the K channel, is shown in detail and described below. The K channel has at least two sub-channels designated 65 and 66, adder 67 in channel 65 forming the sum signal $S_{1,4}$ as defined in equation (9A) while adder 68 in the other sub-channel forms the sum signal $S_{3,4}$ as defined in equation (9B), all from suitable outputs of the photomultipliers in head 10. Delay circuits 69 associated with each of adders 68, 67, delay each of the sum signals by the delay time $\delta$. Thus, charge pulse 70 shown in FIG. 12(a) produced by head 10 in response to a light event results in a delayed pulse 71 shown in FIG. 12(d). Within the delay time whose order of magnitude is $0.8\mu$sec, window circuit 63 is effective to determine whether the light event fits within the energy window associated with the investigation being carried out with head 10, and inhibits or allows computation of the location of the event depending on such determination.

Figure 12:
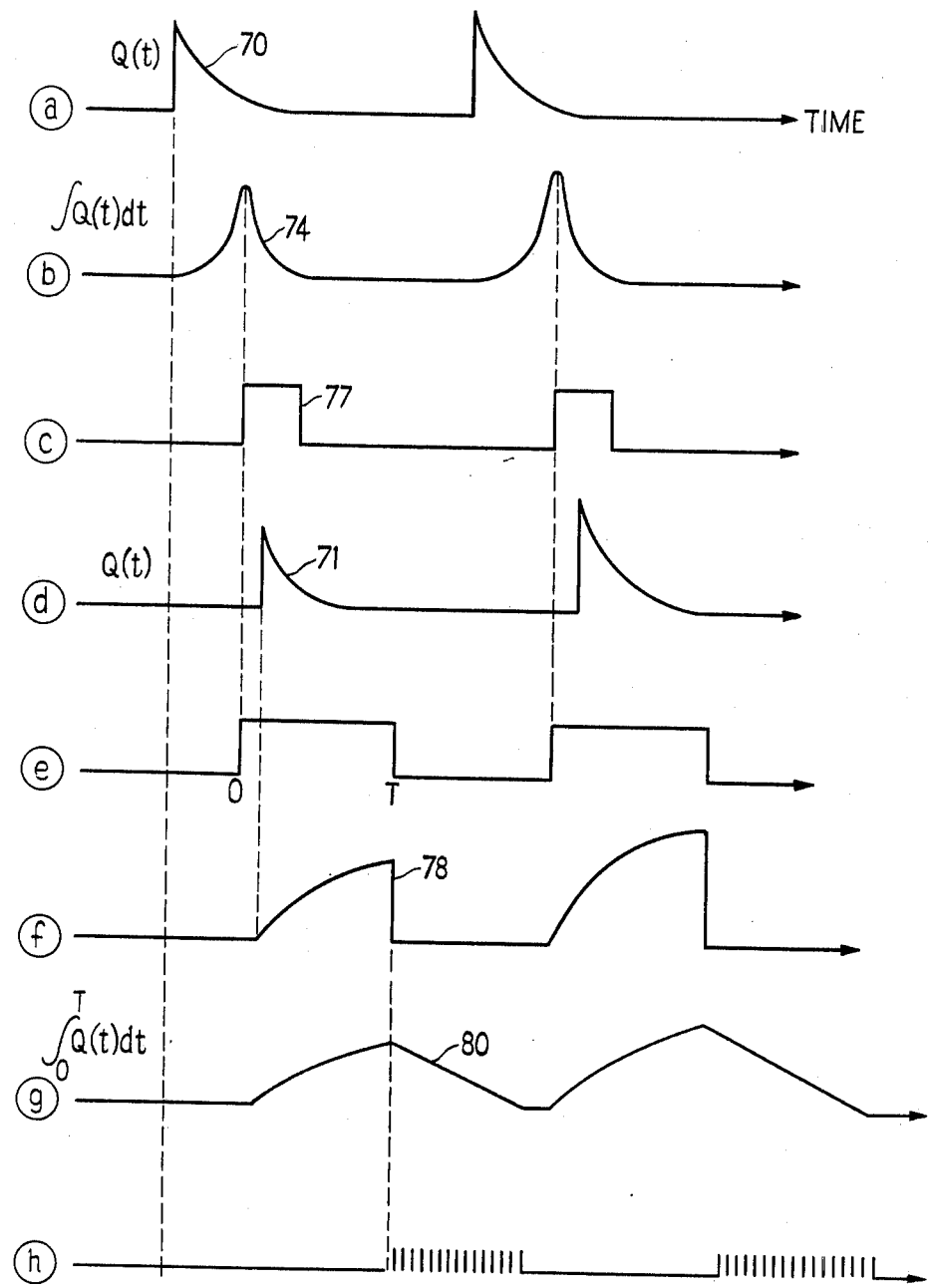

Adder 72 in channel 63 adds the outputs of all of the photomultipliers to obtain a pulse whose integrated value is proportional to the total energy of the light event. Integration is carried out, preferably by amplifier 73 having a Gaussian-shaped response that peaks at about 0.4 $\mu$sec. A suitable amplifier is the Model CAV-N-3 main amplifier manufactured by Elscint Ltd. Haifa, Israel. By reason of the nature of amplifier 73, the peak of pulse 74 is determined by discriminator 75 within the delay time $\delta$, i.e., before pulses appear at the output of delay circuits 69. If the peak is within the energy window as established by the single channel analyzer 76 (which may be a model SCA-N-3 single channel analyzer manufactured by Elscint Ltd., Haifa, Israel), the latter produces an enabling gate pulse 77 shown in FIG. 12(c). Gate pulse 77 is applied to each of gated integrators 78 which are effective to integrate the respective delayed sum signals over a fixed period of duration T seconds as indicated in FIG. 12(e). If the single channel analyzer fails to produce a gate pulse because the total energy is not within the window, no integration takes place and the circuitry is immediately ready to accept another output from the head 10.

Within the integration time T, about 95% of the charge in pulse 71 is accumulated producing a pulse like that at 78 in FIG. 12(f) whose peak value is proportional to the total charge in pulse 71. The integrated pulses in the two channels are converted into digital signals in analog-to-digital converters 79 within which a normalization process is carried out during the rundown of the converters indicated generally by ramp 80 in FIG.

12(g). Normalization utilizes channel 64 that includes adder 81, delay circuit 82 and gated integrator 83. Adder 81 adds all of the outputs of all of the photomultipliers to obtain a signal like that produced by adder 72. If the total energy of an event falls within the required energy window, (the precise value of the energy is established at the output of integrator 83, as a peak value, much the same as each of integrators 78 operates on the sum signals to ascertain their values), normalization (i.e., division by the total energy) is carried out during the rundown of the converters 79 by changing the discharge rate of analogue-to-digital converters 79. Thus while the input to each of the analog-to-digital converters 79 contains both location and energy information, the output of each of these converters contains only location information in the form of a train of pulses, the number of which are proportional to the magnitude of sum signals $S_{1,4}$ and $S_{2,3}$ respectively.

Digital limiting to achieve the lower cutoff for the sum signal $S_{1,4}$ and the upper cutoff sum signal $S_{2,3}$ is achieved by the logic and registers contained in elements identified by reference numerals 85 and 86. Thus, in channel 65, element 85 starts to register input pulses only after the number of input pulses exceeds the number corresponding to $N_O$ (FIG. 10). In channel 66, on the hand, register 86, which is cleared to begin with, starts to count when the pulsed output of the analog-to-digital converter commences, but counts no further pulses after a maximum number is reached, such number corresponding to $M_O$ (FIG. 10). The outputs of registers 85 and 86 are the digital representations of the modified sum signals $(S_{1,4})'$ and $(S_{2,3})'$ previously described.

These modified sum signals are applied to a full adder 87 producing a number proportional to the displacement of the event from the centerline of the crystal, but ambiguous as to which side of the center line the event has occurred. The ambiguity is resolved by reason of the polarity of the sum signal $S_{1,4}$ derived from absolute value amplifier 88 in channel 66 and applied to coordinate shifter 89.

If desired, the origin may be shifted from row 3 to row 5 so that all of the displacements are positive, or at least uni-directional, although a coordinate system based on the geometric center of the crystal is also possible. In the latter case the output of amplifier 88 will be used to apply a sign to the output of adder 87. When the coordinate axis is shifted to row 5, a predetermined constant is added to the output of full adder 87 depending upon which strip contains the event as determined by the polarity information of amplifier 88.

Finally, the projection K of an event measured from row 5 on one of the three reference axes is combined with the displacement L and M of the event on the other axes in computer module 90 which performs the indicated computation providing the $x$ and $y$ co-ordinates. These are in digital form and may be utilized as such. If these co-ordinates are required in analog form, the digital signals $x$ and $y$ may be applied to a digital-to-analog converter 91.

The specific sum signals $S_{1,4}$ and $S_{2,3}$ as well as their modified counterparts are merely illustrative of the types of analytical functions of the outputs of the photomultipliers that can be used. Other functions may be used, and can be derived from experimental combinations of the outputs.

Because of the random timing of the events to which the circuitry of FIG. 11 must respond, it is necessary to provide for base line restoration of the pulsed input to gated integrators 78 in each of the K, L and M channels as well as to the pulsed input to gated integrator 83 in normalizing channel 64. Base line restoration is a common expedient in pulse counting techniques, and such expedient is not shown in the drawing for this reason.

What is claimed is:
1. A scintillation camera comprising:
a. a planar, unitary scintillating crystal responsive to radiation stimuli for producing light events at spatial locations corresponding to the spatial locations of the interactions of the stimuli with the crystal;
b. a plurality of photomultipliers positioned with their optical axes perpendicular to the plane of the crystal and having photocathodes for receiving light from the crystal, each photomultiplier producing an output in response to a light event in the crystal; and
c. computing circuitry coupled to said photomultipliers for computing the projection of a light event in the crystal on a reference axis including means for forming an analytical function of the outputs of only those photomultipliers that are close to the light event in the crystal without attenuating such outputs.

2. A scintillation camera comprising:
a. a planar, unitary scintillating crystal responsive to radiation stimuli for producing light events at spatial locations corresponding to the spatial locations of the interactions of the stimuli with the crystal;
b. a plurality of photomultipliers positioned with their optical axis perpendicular to the plane of the crystal and having photocathodes for receiving light from the crystal, each photomultiplier producing an output in response to a light event in the crystal; and
c. computing circuitry coupled to said photomultipliers for combining the outputs thereof to compute the projection on a reference axis of a light event in the crystal, including means responsive to the spatial location of the light event for selecting the photomultipliers whose outputs are to be combined and for determining the manner in which such outputs are combined.

3. A scintillation camera according to claim 2 wherein said means responsive to the spatial location of the light event in effective to exclude those photomultipliers remote from the location of the event.

4. A scintillation camera according to claim 2 wherein said means responsive to the spatial location of the light event includes means for specifying in which of a plurality of predetermined regions of the crystal the event has occurred, and means responsive to the specified region for combining the photomultiplier outputs in a way that minimizes error between the computed projection of the event on the reference axis and the actual projection.

5. A scintillation camera according to claim 4 wherein said means responsive to the specified region minimizes error by combining the outputs of only those photomultipliers adjacent the event.

6. A scintillation camera according to claim 2 wherein the photomultipliers are arranged in a pattern whose motif includes at least three photomultipliers and which is defined by at least two sets of intersecting parallel rows of photomultipliers, each set of parallel rows being associated with and perpendicular to a reference axis lying in the plane of the crystal, said computing circuitry including circuit means associated with one reference axis comprising:

a. an adder for each row of photomultipliers in a set with which said one reference axis is associated for summing the outputs of the photomultipliers in a row and producing a row signal in response to a light event; and b. means for computing the projection on said one reference axis of a light event by using a row signal produced by a selected one of the two adjacent rows of photomultipliers in the set between which the light event has occurred, which two adjacent rows are termed "base rows" of the set.

7. A scintillation camera according to claim 6 wherein the means for computing the projection uses only a single row signal produced by a selected one of the base rows.

8. A scintillation camera according to claim 6 wherein the means for computing the projection uses only the sum of a row signal produced by the selected one of the base rows and the row signals produced by at least one of the non-base rows adjacent to the selected base row.

9. A scintillation camera according to claim 6 wherein the means for computing the projection uses only the difference between the row signals produced by the base rows.

10. A scintillation camera according to claim 6 wherein the means for computing the projection uses only the difference between the row signal produced by a selected one of the base rows and the sum of the row signals produced by the other base row and at least one of the non-base rows adjacent thereto.

11. A scintillation camera according to claim 6 wherein means for computing the projection uses only the difference between the sum of the row signals produced by a selected one of the base rows and at least one of the non-base rows adjacent thereto and the sum of the row signals produced by the non-selected base row and at least one of the non-base rows adjacent thereto.

12. A scintillation camera according to claim 8 wherein the means for computing the projection uses only the sum of a row signal produced by the selected one of the base rows and the row signal produced by the non-base row adjacent the selected base row.

13. A scintillation camera according to claim 6 including means for computing the Cartesian coordinates of a light event where such coordinates have a predetermined spatial location on the crystal.

14. A scintillation camera according to claim 6 wherein the arrangement of photomultipliers is hexagonal and there are three sets of intersecting parallel rows of photomultipliers defining three reference axes that intersect each other at 60°.

15. A scintillation camera according to claim 6 wherein the arrangement of photomultipliers is rectangular and there are two sets of intersecting parallel rows of photomultipliers defining two reference axes that intersect at 90°.

16. A scintillation camera according to claim 11 including means for summing the outputs of all of the photomultipliers for obtaining a measure of the total energy of a light event, and means for normalizing the outputs of the photomultipliers by a division operation involving the total energy of a light event.

17. A scintillation camera according to claim 1 including means for mounting the photomultipliers relative to the crystal so that the photomultipliers are spaced from the crystal a distance that optimizes the geometric sensitivity of the photomultipliers.

18. A scintillation camera according to claim 2 wherein the photomultipliers are arranged in a pattern whose motif includes at least three photomultipliers and which is defined by at least two sets of intersecting parallel rows of photomultipliers, each set of parallel rows being associated with and perpendicular to a reference axis lying in the plane of the crystal, said computing circuitry including circuit means associated with one reference axis comprising:

a. means for forming a pair of signals that are different analytical functions of the outputs of the photomultipliers in a set with which said one reference axis is associated;

b. each of the signals varying linearly as the projection of a light event moves along the reference axis over different portions thereof;

c. each of the signals varying non-linearly as the projection of a light event moves along the reference axis over a common portion thereof; and d. means for computing the projection on said one reference axis of a light event using one or the other of the signals when the projection of the light event lies on a portion of the axis over which the signal is linear, and by using an analytical combination of the pair of signals when the projection of the light event lies on said common portion of the reference axis.

19. A scintillation camera according to claim 18 wherein there are five rows in a set and one analytical function of the outputs of the photomultipliers in proportional to $R_1 + R_5 - K_0 R_3$ where $R_i$ is the sum of the $i$th row of photomultipliers and $K_0$ is a constant and the other analytical function is proportional to $R_1 + R_2 - (R_4 + R_5)$.

20. A scintillation camera according to claim 18 wherein the analytical function of the two signals is their sum.

21. A scintillation camera according to claim 20 wherein there are five rows in a set and one analytical function of the outputs of the photomultipliers is proportional to $R_1 + R_5 - K_0 R_3$, the other analytical function being proportional to $R_1 + R_2 - (R_4 + R_5)$ where $R_i$ is the sum of the $i$th row of photomultipliers, and $K_0$ is a constant.

22. A scintillation camera according to claim 18 wherein the means for computing the projection on said one reference axis comprises:

a. at least two channels, each of which comprises a pair of adders that algebraically add the outputs of a plurality of rows of photomultipliers in the set with which the reference axes associated for producing the sum signals in response to a light event, a delay circuit associated with each adder for delaying the sum signals, and a gated integrator for integrating the sum signals over a predetermined interval of time in response to a gate signal for producing a pair of signals each of whose magnitudes is a function of the energy of the light event and its location; and b. energy detection means for producing a gate signal that is applied to the gated integrator within the delay time of the delay circuit when the energy of a light event falls within a predetermined energy window whereby the sum signals are integrated only if the energy of the light event falls within the energy window.

23. A scintillation camera according to claim 20 wherein each channel also includes an analog-to-digital converter by which the output of each gated integrator is converted to a digital signal normalized by the total energy of the light event.

24. A scintillation camera according to claim 23 wherein each of the channels includes a logic circuit responsive to the normalized digit signal produced by the analog-to-digital circuit of the channel for producing a modified digital signal whose magnitude depends on the relationship between the normalized digital signal and a constant.

25. A scintillation camera according to claim 24 wherein the means associated with each reference axis includes a full adder for adding the modified digital signals to produce a digital signal that is the projection of an event on the reference axis.

26. A scintillation camera according to claim 25 wherein the algebraic sums of the adders in the two channels are: $S_{1,4} = R_1 + R_5 - K_0R_3$, where $R_i$ is the sum of the $i$th row of photo-multipliers and $K_0$ is a linearization constant; and $S_{2,3} = R_1 + R_2 - (R_4 + R_5)$.

27. In a scintillation camera having a scintillating crystal responsive to radiation stimuli for producing light events at spatial locations corresponding to the spatial locations of the interactions of the stimuli with the crystal, a plurality of photomultipliers for receiving light from the crystal and producing outputs in response to light events in the crystal, and computing circuitry for computing the coordinates of a light event using the outputs of the photomultipliers, the improvement in which comprises: means for delaying the application of the outputs of the photomultipliers to the computing circuitry while a measure of the total energy of a light event is computed, and for applying the delayed outputs to the computing circuitry only if said measure exceeds a threshold.

28. The improvement of claim 27 including:
a. delay means for delaying the outputs of the photomultipliers;
b. fast SCA means responsive to the undelayed outputs of the photomultipliers for computing a measure of the total energy of a light event within the delay time of the delay means, and producing an enable signal only if said measure exceeds a threshold; and
c. gate means responsive to said enable signal for applying the delayed output of the photomultipliers to the computing circuitry.

29. The improvement of claim 28 wherein the gate means is a gated integrator.

30. The improvement of claim 28 including base line restoration means between the gate means and the computing circuitry.

31. In a scintillation camera having a scintillating crystal responsive to radiation stimuli for producing light events at spatial locations corresponding to the spatial locations of the interactions of the stimuli with the crystal; a plurality of photomultipliers for receiving light from the crystal and producing outputs in response to light events in the crystal, and an integrator for integrating the outputs of the photomultipliers as part of the computation circuitry by which the coordinate of a light event is computed, the improvement in which comprises a gated integrator for integrating the photomultiplier outputs.

32. The improvement of claim 31 including base line restoration means through which the outputs of the photomultipliers pass before being applied to the gated integrator.

33. In a scintillation camera having a scintillating crystal responsive to radiation stimuli for producing light events at spatial locations corresponding to the spatial locations of the interactions of the stimuli with the crystal, a plurality of photomultipliers for receiving light from the crystal and producing outputs in response to a light event in the crystal; and computing circuitry for computing the coordinates of a light event using the outputs of the photomultipliers; the improvement in which includes base line restoration means operating on the outputs of the photomultipliers before such outputs are applied to the computing circuitry.

* * * * *